United States Patent
Wimmer et al.

(10) Patent No.: US 12,187,109 B2
(45) Date of Patent: Jan. 7, 2025

(54) WIND DEFLECTOR COMPRISING A DEFLECTOR ELEMENT MADE OF A WARP-KNITTED FABRIC AND METHOD FOR PRODUCING THE DEFLECTOR ELEMENT

(71) Applicant: Webasto SE, Stockdorf (DE)

(72) Inventors: Rudolf Wimmer, Stockdorf (DE); Uwe-Gert Heiner, Tübingen (DE)

(73) Assignee: WEBASTO SE, Stockdorf (DE)

( * ) Notice: Subject to any disclaimer, the term of this patent is extended or adjusted under 35 U.S.C. 154(b) by 251 days.

(21) Appl. No.: 17/885,786

(22) Filed: Aug. 11, 2022

(65) Prior Publication Data

US 2023/0060022 A1    Feb. 23, 2023

(30) Foreign Application Priority Data

Aug. 23, 2021  (DE) ..................... 10 2021 121 756.3

(51) Int. Cl.
   B60J 7/22    (2006.01)
(52) U.S. Cl.
   CPC ..................... B60J 7/22 (2013.01)
(58) Field of Classification Search
   CPC .................. B60J 7/22; B60J 7/223
   USPC .................. 296/217, 180.1, 180.5
   See application file for complete search history.

(56) References Cited

U.S. PATENT DOCUMENTS

| | | | |
|---|---|---|---|
| 8,267,465 B2 * | 9/2012 | Wetzels | B60J 7/22 296/180.1 |
| 8,833,403 B2 * | 9/2014 | Le Costaouec | D03D 3/005 139/195 |
| 9,090,150 B1 * | 7/2015 | Krauss | B60J 7/22 |
| 2001/0034169 A1 | 10/2001 | Goetz et al. | |
| 2009/0309393 A1 | 12/2009 | Pihale | |

FOREIGN PATENT DOCUMENTS

| | | |
|---|---|---|
| DE | 10012166 A1 | 9/2001 |
| DE | 102006006553 B3 | 6/2007 |
| DE | 102009021150 A1 | 11/2010 |
| DE | 102013011872 B4 * | 10/2019 ................ B60J 7/22 |
| EP | 0897029 B1 * | 8/1998 |

OTHER PUBLICATIONS

DE102013011872 Text (Year: 2019).*
EP0897029 (Year: 1998).*
Office Action issued on corresponding German Patent Application No. 102021121756.3 dated Mar. 5, 2024; Machine translation (6 pages).

* cited by examiner

*Primary Examiner* — Dennis H Pedder
(74) *Attorney, Agent, or Firm* — Fitch, Even, Tabin & Flannery, LLP

(57) ABSTRACT

A wind deflector for an openable vehicle roof having a displaceable cover element, the wind deflector may have a deployable deflector element which is made of a planar flexible material and forms a windward surface, the deflector element being attached to a pivotable deploying bow at its upper edge area and to a vehicle-attached base at its lower edge area and comprising a warp-knitted fabric having meshes. The warp-knitted fabric is a one-piece warp-knitted fabric. The windward surface is a curved surface whose curvature is defined by the interknitted meshes of the warp-knitted fabric.

15 Claims, 3 Drawing Sheets

WIND DEFLECTOR COMPRISING A DEFLECTOR ELEMENT MADE OF A WARP-KNITTED FABRIC AND METHOD FOR PRODUCING THE DEFLECTOR ELEMENT

CROSS-REFERENCE TO RELATED APPLICATION

This application claims priority from German patent application no. 10 2021 121 756.3, filed on Aug. 23, 2021, which is hereby incorporated herein by reference in its entirety for all purposes.

FIELD

The invention relates to a wind deflector for an openable vehicle roof, the wind deflector comprising the features of the preamble of claim 1, and a method for producing a deflector element of a wind deflector.

BACKGROUND

A wind deflector of this kind is known from practice and is used in combination with an openable vehicle roof having a cover element which is displaceable in a longitudinal vehicle direction. The wind deflector is disposed in a front edge area of a roof opening of the vehicle roof which can be closed or at least partially opened at will by means of the cover element. The wind deflector comprises a deflector element as a windward element, the deflector element being made of a planar flexible material and being attached to a pivotable deploying bow at its upper edge and to a vehicle-attached base at its lower edge. The deflector element is in particular made of a mesh-like material, which can be a warp-knitted fabric. The deploying bow is essentially U-shaped and is mounted in a pivotable manner in the area of respective roof-attached guide rails at its free legs, which each form a deploying arm. The deploying bow is pivotable between a lowered rest position, in which the deflector element is folded, and a deployed functional position, in which the deflector element is deployed and forms a windward surface, as a function of the open position of the cover element. The deflector element is attached to the deploying bow and the vehicle-attached base via what is referred to as edge tapes, which form welts and are sewn to the planar flexible material. Alternatively, it is known for the edge tapes to be molded onto the flexible material by injection molding or similar techniques.

When producing conventional deflector meshes, a length of fabric, which can also be a warp-knitted fabric, is unwound from a roll. Then it is cut by hot cutting or laser cutting. Subsequently, the edge tapes are attached to the resulting cut piece of fabric. Exposed side edges of the cut piece of fabric can be protected against tearing by means of a rolled hem or the like. Moreover, it is known for reinforcing strips to be attached to the cut piece of fabric by molding, gluing or sewing.

Cutting the length of fabric results in fabric waste. Moreover, cutting a stack of multiple layers of fabric can cause warpage, which means that the resulting cut pieces of fabric may not meet the desired demands in terms of their dimensions. Attaching the edge welts and the reinforcements and forming the edge protection is time consuming and thus involves high costs. Furthermore, the cut piece of fabric will wrinkle in the deployed state since the cut piece of fabric is a two-dimensional plane element.

SUMMARY

The object of the invention is to provide a wind deflector having a deflector element which can be produced in a cost-effective production process, and a method for producing the deflector element.

According to the invention, this object is attained by the wind deflector having the features of claim 1 and the method having the features of claim 11.

So, according to the invention, a wind deflector for an openable vehicle roof having a displaceable cover element is proposed, the wind deflector comprising a deployable deflector element which is made of a planar flexible material and forms a windward surface, the deflector element being attached to a pivotable deploying bow at its upper edge area and to a vehicle-attached base at its lower edge area and being a one-piece warp-knitted fabric which has or is formed by meshes. The windward surface of the deflector element is a curved surface whose curvature is defined by the interknitted meshes of the warp-knitted fabric.

Thus, the invention provides a deflector element of a wind deflector which is a three-dimensionally warp-knitted shaped piece whose width, height, and depth and whose curvature are produced by the warp-knitting process itself. Consequently, due to its production process alone, the deflector element preferably has a three-dimensional contour which corresponds to the contour of the deflector element in the deployed state of the pivotable deploying bow, in which the deflector element is deployed. The deflector element is preferably wrinkle-free in its deployed state because of its windward surface, which is a curved surface.

In a preferred embodiment of the wind deflector, the warp-knitted fabric has a warp-knitted edge thickening. The warp-knitted edge thickening can be used directly to attach the deflector element to the deploying bow or to the vehicle-attached base and can thus act as a kind of welt or be a lateral edge protection protecting the warp-knitted fabric against tearing. The warp-knitted edge thickening is co-produced directly in the process during the production of the warp-knitted fabric. A subsequent process is not required, which in turn reduces the costs of producing the deflector element.

In another specific embodiment of the wind deflector according to the invention, the warp-knitted fabric of the deflector element has a warp-knitted pocket in which a reinforcing element is disposed. The pocket is also co-produced in the process during the production of the warp-knitted fabric in this embodiment.

In a preferred embodiment of the wind deflector according to the invention, the pocket of the warp-knitted fabric is an edge pocket which accommodates a welt element as a reinforcing element, the welt element securing the attachment of the deflector element to the deploying bow or the vehicle-attached base.

Alternatively, the pocket can also be formed in the surface of the deflector element at a distance from the edges with the result that the reinforcing element supports the shaping of the deflector element in its deployed state.

The reinforcing element, which can be tape-, cord- or strip-shaped, can be completely enveloped by the warp-knitted fabric, which means that the reinforcing element is directly incorporated in the manner of an insert during the production of the warp-knitted fabric.

Alternatively, the reinforcing element can also be inserted into the pocket. In this case, the pocket preferably has an opening through which the reinforcing element can be introduced.

In another preferred embodiment of the wind deflector according to the invention, the pocket can have recesses, which means that the reinforcing element, which is in particular a welt element, is exposed in the area of these recesses.

To secure the reinforcing element in the pocket in question, the warp-knitted fabric can be configured in such a manner in the area of the pocket that the reinforcing element is hooked by the warp-knitted fabric from the rear and cannot slide out of the pocket.

In another specific embodiment of the wind deflector according to the invention, the warp-knitted fabric has a warp-knitted reinforcement zone at a distance from its edge.

The reinforcement zone is preferably formed directly by the yarn of the warp-knitted fabric.

Another specific embodiment of the wind deflector according to the invention is configured in such a manner that the warp-knitted fabric has different material thicknesses in portions with the result that optically visible warp-knitted stripes can be formed, for example, which can run vertically or horizontally.

Furthermore, it is conceivable for the warp-knitted fabric to be provided with a pattern, meaning that a warp-knitted logo of the vehicle manufacturer is formed, for example.

Furthermore, the warp-knitted fabric can have tabs, via which it is attachable, in its lateral edge areas. The tabs, which can also be warp-knitted or can be additionally attached, each have a buttonhole-like hole, for example.

In the method according to the invention, by which the planar flexible deflector element is produced, a thread system is warp-knitted in such a manner by means of a warp-knitting machine that the resulting meshes together define an at least partially curved surface which forms a windward surface of the deflector element.

In this method, at least one edge thickening is preferably warp-knitted on the warp-knitted fabric, the edge thickening serving to attach the deflector element to a deploying bow or a vehicle-attached base or forming a lateral edge protection. So the edge thickening is also produced in the warp-knitting machine from the thread system introduced into the warp-knitting machine.

In a specific embodiment according to the invention, at least one pocket for receiving a reinforcing element is further warp-knitted on the warp-knitted fabric from the thread system; the pocket can be an edge pocket for accommodating a welt element or a pocket located in the surface of the deflector element for accommodating a shaping reinforcing element.

The reinforcing element can be warp-knitted into the warp-knitted fabric directly in the process or inserted into the pocket after the production of the warp-knitted fabric.

With the method according to the invention, costs can be saved compared to known production methods since no waste is produced. The width, the height, and the curvature of the deflector element can be set on the warp-knitting machine in a simple manner. Expensive work steps for attaching welts and/or reinforcing elements and/or edge protection elements are not required. Moreover, the deflector element according to the invention forms a dimensionally stable shaped piece which is true to size.

Other advantages and advantageous embodiments of the subject matter of the invention are apparent from the description, the drawing, and the claims.

An illustrative example of a wind deflector according to the invention is schematically illustrated in the drawing and will be discussed in more detail in the following description.

BRIEF DESCRIPTIONS OF THE DRAWINGS

DETAILED DESCRIPTION

Figure 1:
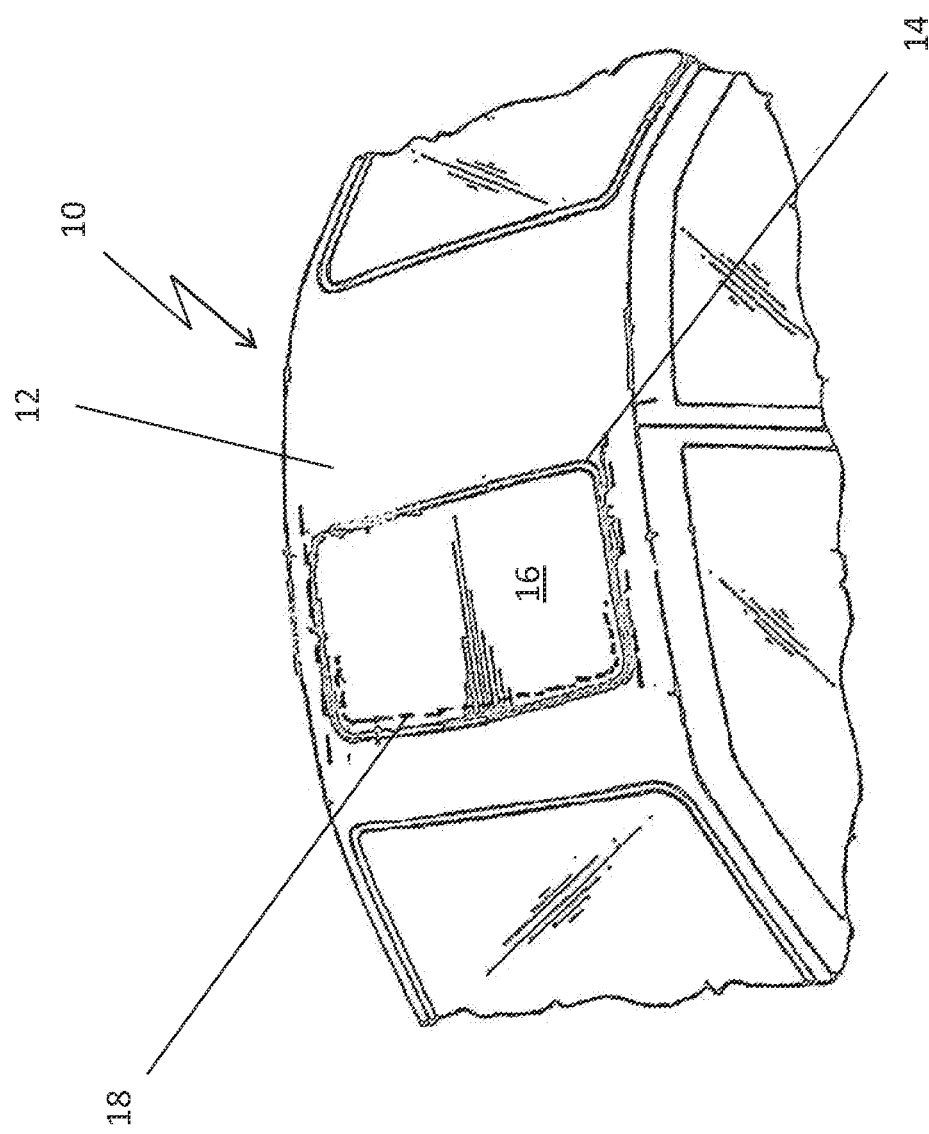
FIG. 1 is a perspective top view of a vehicle roof comprising a wind deflector.

The drawing shows a motor vehicle 10, which has a vehicle roof 12, which is provided with a roof opening 14, which can be closed or at least partially open at will by means of a displaceable cover element 16.

Figure 2:
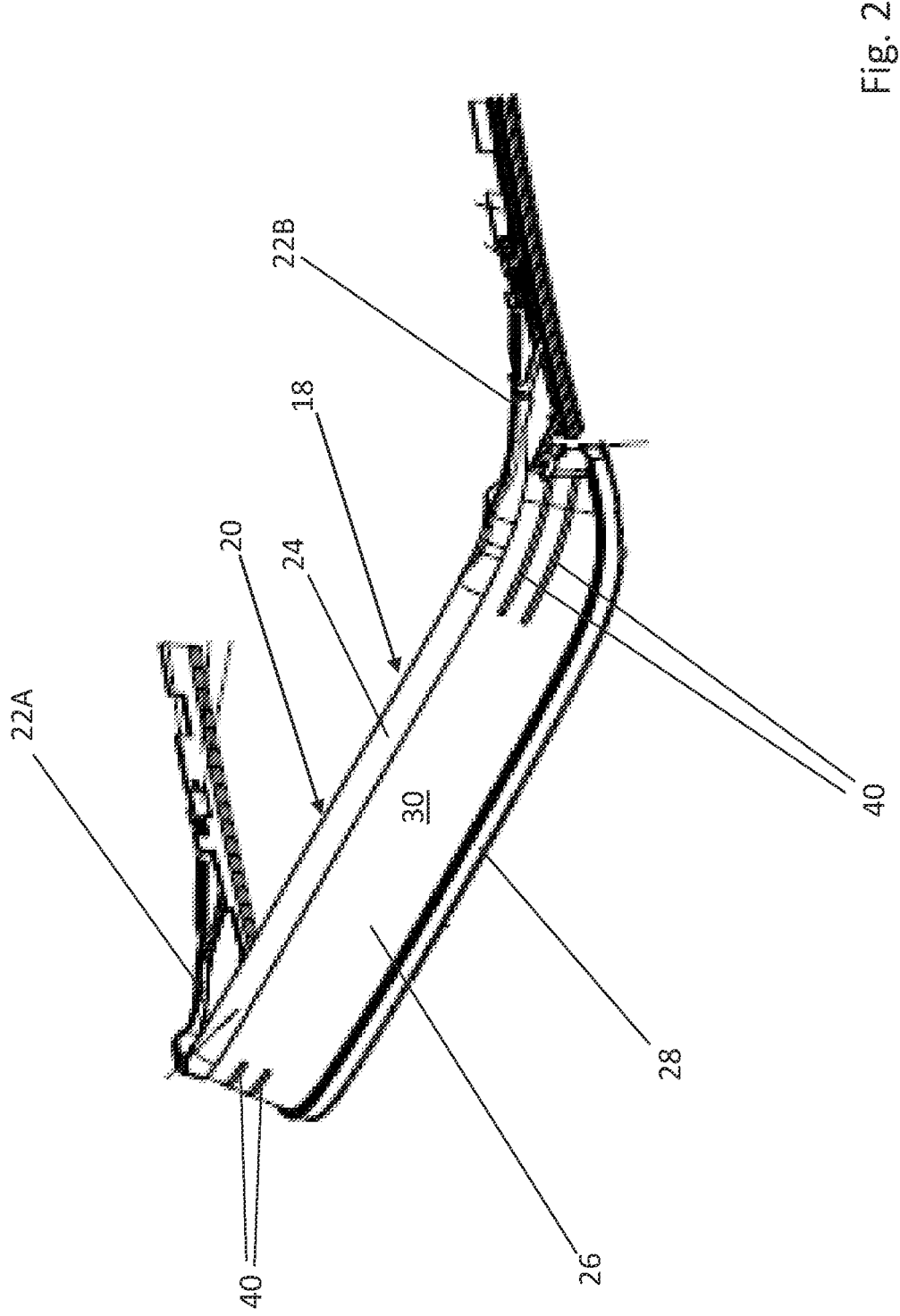
FIG. 2 is a perspective view of the wind deflector.

A wind deflector 18, which can be deployed as a function of the degree of opening of cover element 16, is disposed adjacent to a front edge area of roof opening 14, wind deflector 18 essentially extending in the transverse vehicle direction and serving to prevent the occurrence of potentially disturbing air flows and air turbulence in the vehicle interior when roof opening 14 is open. So wind deflector 18, which will be described in detail with reference to FIGS. 2 to 4 below, is a functional element which is active when cover element 16 is in the open position.

Wind deflector 18 comprises an at least approximately U-shaped deploying bow 20, which has two legs 22A and 22B, which serve as deploying arms, and a transverse leg 24, which extends in the transverse vehicle direction and connects the two legs 22A and 22B, which extend in the longitudinal vehicle direction. Deploying arms 22A and 22B are each mounted in a pivotable manner in the area of a guide rail for cover element 1 6, the guide rail extending in the longitudinal vehicle direction, and are each pre-loaded in the deploying direction by means of a deploying spring. The degree of deployment of deploying arms 22A and 22B and thus deploying bow 20 is determined by a position of cover element 16 in the longitudinal vehicle direction. When roof opening 14 is being closed, cover element 16 slides onto deploying arms 22A and 22B from behind starting from an open position, which causes them to be pushed downward against the force of the deploying springs and deploying bow 20 to be pivoted from its functional position into its rest position. When cover element 16 is being displaced in the rear direction, deploying arms 22A and 22B are released, which allows deploying bow 20 to automatically move into its functional position by the action of the deploying springs.

Figure 3:
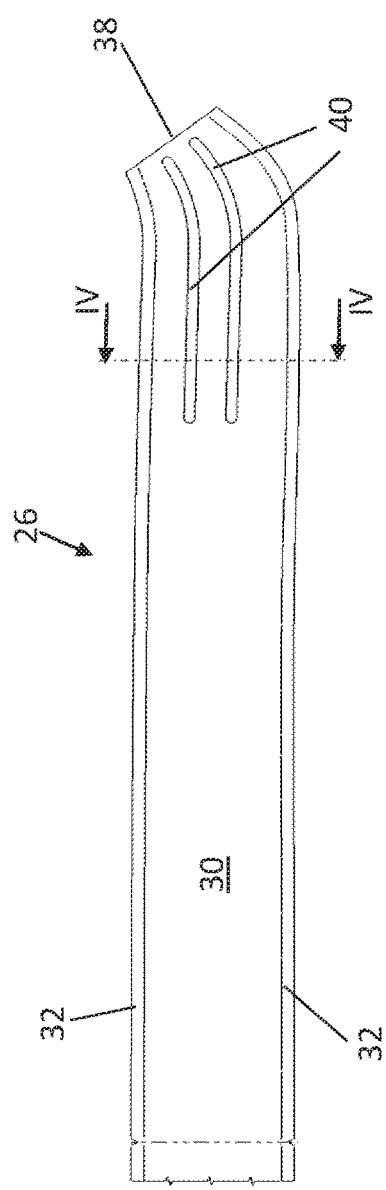
FIG. 3 shows one half of a deflector element of the wind deflector.
Figure 4:
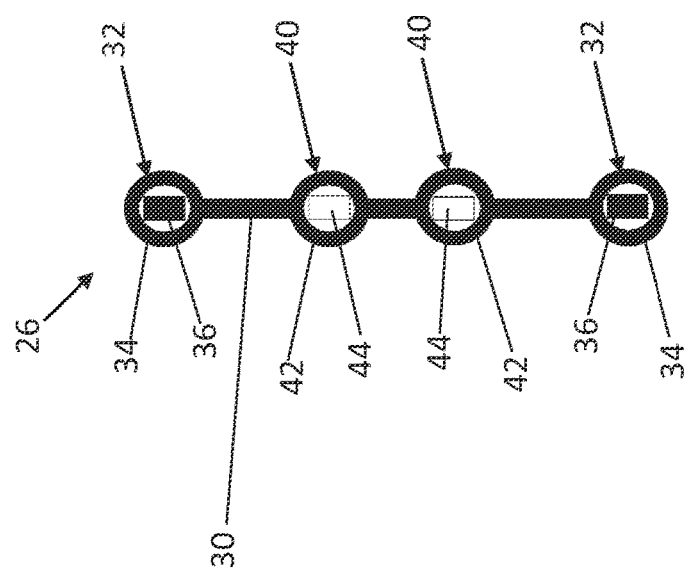
FIG. 4 is a section through the deflector element along line IV-IV in FIG. 3.

Wind deflector 18 comprises a deflector element 26, which is illustrated in isolation in FIGS. 3 and 4 and which is disposed between deploying bow 20 and a vehicle-attached base 28, which can be formed by a sunroof frame which also comprises the guide rails for cover element 16.

Deflector element 26 is made of a flexible foldable material and is a warp-knitted three-dimensional shaped piece, which is composed of one piece and forms a windward surface 30 of wind deflector 18, windward surface 30 being a curved surface, whose curvature is defined by the interknitted meshes of the warp-knitted fabric. The contour of the shaped piece, i.e., the warp-knitted fabric, and the curvature of the shaped piece, i.e., the warp-knitted fabric, are predetermined by the warp-knitting process carried out in a warp-knitting machine.

Warp-knitted deflector element 26 comprises respective warp-knitted edge thickenings 32 at its upper edge and at its lower edge, each edge thickening 32 being formed by a pocket 34, which accommodates a tape-like welt element 36 for forming and edge welt, welt element 36 being a reinforcing element and extending across the entire width of deflector element 26. In the installed position, the edge welts formed by pockets 34 and welt elements 36 each engage a corresponding welt groove of deploying bow 20 and vehicle-attached base 28, respectively.

The warp-knitted fabric has a warp-knitted edge thickening 38, which is formed by a material thickening, at the lateral edges of deflector element 26 so as to provide these edges with an edge protection.

To stabilize windward surface 30 in the lateral curved surface portions, deflector element 26 has two reinforcing ribs 40 in each of its lateral portions on either side, reinforcing ribs 40 each also being formed by respective warp-knitted pockets 42, in each of which a reinforcing element 44 in the form of a plastic strip, a tape or a wire is disposed. Pockets 42 are also produced in the process during the production of deflector element 26.

Deflector element 26 is produced by warp-knitting a thread system by means of a warp-knitting machine in such a manner that the resulting meshes together define curved windward surface 30 and pockets 34 and 42 and edge thickening 38 are co-warp-knitted from the thread system in the process. In the warp-knitting process, welt elements 36 for forming the edge welts and reinforcing elements 44 for forming ribs 40 are enveloped by the employed thread system with the result that finished deflector element 26 including elements 36 and 44 warp-knitted into it can be removed from the warp-knitting machine and can be connected to vehicle-attached base 28 and deploying bow 20 of wind deflector 18 during assembly without any additional previous processing.

The invention claimed is:

1. A wind deflector for an openable vehicle roof having a displaceable cover element, the wind deflector comprising:
    a deployable deflector element which is made of a planar flexible material and forms a windward surface,
    the deflector element being attached to a pivotable deploying bow at its upper edge area and to a vehicle-attached base at its lower edge area and comprising a warp-knitted fabric having meshes,
    wherein the warp-knitted fabric is in one piece, and the windward surface is a curved surface whose curvature is defined by the interknitted meshes of the warp-knitted fabric; and
    wherein the one-piece warp-knitted fabric has a warp-knitted edge thickening.

2. The wind deflector according to claim 1, wherein characterized the edge thickening is a lateral edge protection.

3. The wind deflector according to claim 1, wherein in that the edge thickening comprises a welt for attaching the warp-knitted fabric to the deploying bow or to the vehicle-attached base.

4. The wind deflector according to claim 1, wherein the one-piece warp-knitted fabric has a warp-knitted pocket in which a reinforcing element is disposed.

5. The wind deflector according to claim 4, wherein the pocket is an edge pocket and the reinforcing element is a welt element.

6. The wind deflector according to claim 4, wherein the reinforcing element is completely enveloped by the warp-knitted fabric.

7. The wind deflector according to claim 4, wherein the reinforcing element is inserted into the pocket.

8. The wind deflector according to claim 1, wherein the warp-knitted fabric has a warp-knitted reinforcement zone at a distance from its edge.

9. The wind deflector according to claim 1, wherein the warp-knitted fabric has portions having different material thicknesses.

10. The wind deflector according to claim 1, wherein the warp-knitted fabric is provided with a warp-knitted pattern.

11. A method for producing a planar flexible deflector element of a wind deflector, comprising the steps of:
    providing a warp-knitted fabric for the deflector element having meshes,
    providing a thread system being warp-knitted into a one-piece warp-knitted fabric in such a manner that the resulting meshes together define an at least partially curved surface which forms a windward surface of the deflector element, and
    wherein at least one edge thickening is knitted on the warp-knitted fabric.

12. The method according to claim 11, wherein at least one pocket for accommodating a reinforcing element is warp-knitted on the warp-knitted fabric.

13. The method according to claim 12, wherein the pocket is an edge pocket, and the reinforcing element is a welt element.

14. The method according to claim 12, wherein the reinforcing element is warp-knitted into the warp-knitted fabric.

15. The method according to claim 12, wherein the reinforcing element is inserted into the pocket.

* * * * *